United States Patent [19]
Milbert

[11] 3,821,140
[45] June 28, 1974

[54] ORGANOPOLYSILOXANE COMPOSITIONS
[75] Inventor: Gerard Milbert, Ecully, France
[73] Assignee: Rhone-Poulence S.A., Paris, France
[22] Filed: Jan. 5, 1973
[21] Appl. No.: 321,307

[30] Foreign Application Priority Data
Jan. 7, 1972 France.......................... 72.00504
Oct. 23, 1972 France............................ 72.37511

[52] U.S. Cl...... 260/18 S, 260/37 SB, 260/45.75 R, 260/46.5 G, 260/46.5 UA
[51] Int. Cl............................................. C08g 51/72
[58] Field of Search...... 260/45.75 R, 37 SB, 18 SB, 260/46.5 UA, 46.5 G

[56] References Cited
UNITED STATES PATENTS

| | | | |
|---|---|---|---|
| 2,938,009 | 5/1960 | Lucas............................. | 260/37 SB |
| 3,142,655 | 7/1964 | Bobear.............................. | 260/2 S |
| 3,468,838 | 9/1969 | Loraine et al................... | 260/37 SB |
| 3,514,424 | 5/1970 | Noble et al...................... | 260/37 SB |
| 3,539,530 | 11/1970 | Karstedt...................... | 260/46.5 UA |
| 3,635,874 | 1/1972 | Laur et al........................ | 260/37 SB |
| 3,647,741 | 3/1972 | Hutchinson..................... | 260/37 SB |

Primary Examiner—Melvyn I. Marquis
Attorney, Agent, or Firm—Cushman, Darby & Cushman

[57] ABSTRACT

A polysiloxane composition curable to a fire resistant elastomer comprises (a) an organopolysiloxane rubber with blocked ends, at least 50 percent of the organic radicals being methyl, (b) an inorganic filler, organic peroxide, and per 100 parts rubber 0.001-0.01 parts of an additive comprising platinum, 3-35 parts of rare earth metal oxide, or 1 – 8 parts of rare earth metal hydroxide, the latter optionally with up to 5 parts of magnesium oxide.

18 Claims, No Drawings

ORGANOPOLYSILOXANE COMPOSITIONS

This invention relates to organopolysiloxane compositions which cure at elevated temperatures to give elastomers as well as the elastomers produced.

Cured organopolysiloxane elastomers with fire resistant properties are currently being used more and more to prevent the vital components of vehicles carrying a large number of people or expensive and dangerous apparatus from being destroyed by fire. It is known that organopolysiloxane compositions, which cure at elevated temperatures and contain small amounts of platinum, can be cured to obtain elastomers of reduced combustibility (see e.g. French Patent Specifications Nos. 1,486,530 and 1,489,621). However, this resistance to fire is still too low to provide a high safety factor and to meet all the requirements of the regulations for preventing fires. It is for this reason that improved compositions have been prepared, such as those described in French Published Applications Nos. 2,051,792 and 2,055,103, which contain, in addition to platinum, pyrogenic titanium oxide or carbon black free from sulphur.

Unfortunately, although these additives sometimes impart to the elastomers an effective resistance to fire, they have a limited field of application due to the fact that the presence of titanium oxide makes it impossible to prepare elastomers with good mechanical properties, secondly that carbon black is difficult to incorporate in the compositions and makes subsequent cleaning of the devices employed difficult and thirdly the presence of the carbon black disturbs the mechanism of crosslinking by the peroxides resulting in elastomers which have very mediocre physical properties.

The present invention provides an organopolysiloxane composition comprising by weight:

a. 100 parts of at least one diorganopolysiloxane rubber of viscosity 2 million to 80 million centipoises at 25°C, consisting essentially of diorganosiloxyl units and blocked at each end of the polymer chain by a triorganosiloxyl, hydroxyl or alkoxy group of one to four carbon atoms, each organic radical bonded to a silicon atom being an alkyl, halogenoalkyl, vinyl, aryl or halogenoaryl radical, at least 50 percent of these organic radicals being methyl radicals, b 5 to 100 parts of at least one inorganic filler, c. 0.2 to 5 parts of an organic peroxide, d. 0.001 and 0.01 parts of an additive comprising platinum (expressed as elemental platinum) and e. either 3 to 35 parts in total of at least one rare earth metal oxide or 1 to 8 parts in total of at least one rare earth metal hydroxide.

In this specification parts are by weight.

The diorganopolysiloxane rubbers used in the compositions of the invention are linear polymers of high molecular weight of the order of 50,000 to 2,000,000. These rubbers consist essentially of diorganosiloxyl units, but they can also contain a minor amount of monoorganosiloxyl units, which may be as much as approximately 1 percent by number.

Examples of organic radicals are alkyl radicals with one to four carbon atoms such as methyl and ethyl, halogenoalkyl radicals with one to four carbon atoms such as 3,3,3-trifluoro-propyl and 4,4,4-trifluoro-butyl, the vinyl radical, aryl radicals with 6 to 8 carbon atoms such as phenyl, tolyl and xylyls, and helogenoaryl radicals such as chlorophenyls, dichlorophenyls, trichlorophenyls and tetrachlorophenyls; the preferred halogen atoms in the helogenoalkyl or halogenoaryl radicals are fluorine and chlorine. The methyl radical represents at least 50 percent, and preferably 70 percent of the number of organic radicals. The alkoxy radical contains one to four carbon atoms, for example, a methoxy, ethoxy, n-propoxy or isopropoxy radical. The organic radicals of the triorganosiloxyl group can represent alkyl, halogenoalkyl, vinyl aryl or halogenoaryl radicals; a trialkylsiloxyl radical, such as a trimethylsiloxyl radical, is preferred.

These organosiloxane rubbers are most frequently prepared by polymerisation of diorganocyclopolysiloxanes by means of a catalytic amount of an alkaline or acid product, and, during the polymerisation, it is optionally possible to add organosilicon monomeric or polymeric compounds or water, in suitable amount, in order to control the molecular weight by blocking the chain ends. Such processes are described, for example, in U.S. Patent specification No. 2,954,357 and French Patent specification Nos. 1,108,764 and 1,134,005.

Conventional fillers are incorporated in the compositions of the invention at the rate of 5 to 100 parts, and preferably 15 to 70 parts, per 100 parts of rubbers. They can be of the type with a large specific surface area such as pyrogenic silica or precipitated silica or reinforcing carbon black; coarser particles can also be used, for example, those based on diatomaceous silica, ground quartz, iron oxide, titanium oxide and calcium carbonate. Advantageously, these fillers can be modified by treatment with organosilicon compounds such as octamethylcyclotetrasiloxane, hexamethyldisilazane, trimethylchlorosilane and dimethylvinylchlorosilane, according to known processes.

For the purpose of preventing the compositions from curing during storage, organosilicon plasticisers can also be added, for example, silanes with hydrolysable groups of hydrolysed or alkoxylated diorganopolysiloxane oils of low molecular weight; such compounds are mentioned, for example, in French Patent specification No. 1,111,969 and in U.S. Patent specification No. 2,890,188. At most 20 parts, and preferably 15, per 100 parts of rubbers provide the desired effect.

Conventional pigments such as chromium oxides and phthalacyanines and/or stabilisers such as iron, cerium and manganese octoates can optionally be introduced into the compositions in amounts which generally do not exceed 20 parts, and preferably 12, per 100 parts of rubbers.

The usual organic peroxides such as cumyl peroxide, benzoyl peroxide, tertiary butyl perbenzoate, 2,4-dichloro-benzoyl peroxide, tertiary butyl peroxide, 0,0-(tertiary butyl)-0-isopropyl percarbonate and 2,5-dimethyl-2,5-di-(tertiary butyl-peroxy)-hexane are used as the curing agents. Amounts ranging from 0.2 to 5 parts, and preferably 0.4 to 2 parts, per 100 parts of rubbers are suitable.

Platinum is present to the extent of 0.001 to 0.01 parts, and preferably 0.002 to 0.007 part, per 100 parts of rubbers, preferably in the form of a derivative which is easy to disperse in the composition, such as an alcoholic solution of chloroplatinic acid, a platinum chloride/olefin complex or the product of the reaction between chloroplatinic acid and an alcohol or aldehyde. These derivatives can be added directly to the composition or in the form of a dispersion in a diorganopolysiloxane polymer.

The rare earth metal oxide is employed at the rate of 3 to 35 parts, and preferably 5 to 25 parts, per 100 parts of rubbers. It is possible to use either mixtures of rare earth oxides, or the oxides of one well-defined metal, such as those of cerium $CeO_2$, of lanthanum $La_2O_3$, of praseodymium $Pr_6O_{11}$ or of neodymium $Nd_2O_3$, or of samarium $Sm_2O_3$.

The rare earth metal hydroxides are used in the proportion of 1 to 8 parts, and preferably 2 to 6 parts, per 100 parts of diorganopolysiloxane rubbers, and magnesium oxide is used in the proportion of 0 to 5 parts. When magnesium oxide is used, the ratio by weight of rare earth metal hydroxides/magnesium oxide is chosen preferably to be greater than 0.7/1 because a lower ratio does not always make it possible to obtain reproducible results.

Ceric hydroxide, cerous hydroxide, lanthanum hydroxide, neodymium hydroxide, praseodymium hydroxide and samarium hydroxide are examples of rare earth metal hydroxides which can be used separately or as a mixture.

It is known that the composition of rare earth metal hydroxides has not been completely elucidated hitherto. By this term, there are to be understood substances, the empirical formula of which contains essentially oxygen, a rare earth metal and hydrogen bonded to an oxygen atom (-OH). The OH units can either be bonded directly to the metal atom or they can form part of combined water molecules, or they can be present in both forms.

The compositions can be made simply by mixing all the components together but, in order to facilitate the dispersion of the inorganic compounds in the compositions of the invention, it is advantageous to use the inorganic compounds in the form of premixes with the usual diorganopolysiloxane rubbers. These mixtures may be produced in a dry atmosphere by means of mills or mixers which are effective in producing homogeneous and unctuous pastes, in which the inorganic compounds have an average particle diameter which is generally less than 40 microns. However, if the rare earth oxides and hydroxides and the magnesium oxide are in the form of a fine and a homogeneous powder, they can be dispersed directly in the composition.

In order to prepare the compositions of the invention, the various components are intimately mixed by means of devices which are well known in the rubber industry, it being possible to incorporate them in any order. However, it is advantageous, in a first stage, to disperse the fillers and pigments (if any) in the base rubber, followed by the plasticisers (if any), stabilisers (if any) and peroxides thereafter; the desired amounts of platinum and rare earth oxides or hydroxides, the latter being optionally combined with magnesium oxide, are then added to these mixtures.

The mixtures of components are optionally milled at a temperature greater than 25°C.

These compositions can be stored ready for use or they can be vulcanised immediately by heating under pressure or in air at temperatures ranging from 100°C to 300°C; the duration of heating varies with the temperature, and it is generally a few minutes at 100°C and a few seconds at 300°C. This operation is sometimes followed by a reheating at about 200°–250°C to complete the vulcanisation and to remove the volatile products. Curing at 115° – 170°C for 8 – 10 minutes, followed by reheating at about 200°C for 4 –16 hours has proved useful. The elastomers formed, which have good mechanical properties and are fire resistant can be used in any of the applications of silicone rubbers which must possess good resistance to fire, for example, the sheathing of electrical conductors, the internal linings of aeroplane compartments, satellites and submarine cabins, the manufacture of floor coverings and pipes for fluids, the coating of electrical equipment and joints for household equipment.

The following Examples illustrate the invention:

EXAMPLE 1

3 curable compositions, A, B and C, prepared by intimately mixing the following constituents, are used:

Composition A 51.5 parts of a diorganopolysiloxane rubber containing 98.6 percent of $(CH_3)_2SiO$ units and 1.4 percent of $(CH_3)CH_2=CHSiO$ units, terminated at each end by a $(CH_3)_2CH_2=CHSiO_{0.5}$ unit, of viscosity 10 million centipoises at 25°C, 55.4 parts of a dimethylpolysiloxane rubber, terminated at each end by a $(CH_3)_3SiO_{0.5}$ unit, of viscosity 20 million centipoises at 25°C, 4 parts of an $\alpha,\omega$-di-(hydroxy)-dimethylpolysiloxane, of viscosity 40 centipoises at 25°C, containing 13 percent by weight of hydroxyl groups, 3 parts of an $\alpha,\omega$-di-(methoxy)-dimethylpolysiloxane, of viscosity 8 centipoises at 25°C, containing 7 percent by weight of methoxy groups, 41 parts of a pyrogenic silica, treated with a mixture formed from 50 parts of octamethylcyclotetrasiloxane and 20 parts of hexamethyldisilazene, and 1.6 parts of a 50 percent by weight dispersion of 2,4-dichloro-benzoyl peroxide in a dimethylpolysiloxane oil, terminated at each end by a $(CH_3)_3SiO_{0.5}$ unit, of viscosity 1,000 centipoises at 25°C.

Composition B 100 parts of a diorganopolysiloxane rubber containing 94.6 percent of $(CH_3)_2SiO$ units, 5.3 percent of $(C_6H_5)_2SiO$ units and 0.1 percent of $(CH_3)CH_2=CHSiO$ units, terminated at each end by a $(CH_3)_3SiO_{0.5}$ unit, of viscosity 15 million centipoises at 25°C, 1.3 parts of an $\alpha,\omega$-di-(hydroxy)-dimethylpolysiloxane, of viscosity 40 centipoises at 25°C, containing 13 percent by weight of hydroxyl groups, 1.3 parts of an $\alpha,\omega$-di-(methoxy)-diorganopolysiloxane, containing 70 percent of $(CH_3)_2SiO$ units and 30 percent of $(C_6H_5)_2SiO$ units, of viscosity 50 centipoises at 25°C, containing 6.5 percent of methoxy groups, 43 parts of pyrogenic silica, treated with octamethylcyclotetrasiloxane, and 1.9 parts of the dispersion of 2,4-dichloro-benzoyl peroxide used in composition A.

Composition C 100 parts of a diorganopolysiloxane rubber containing 94.5 percent of $(CH_3)_2SiO$ units, 5.3 percent of $(C_6H_5)_2SiO$ units and 0.2 percent of $CH_3(CH_2=CH)SiO$ units, terminated at each end by a $(CH_3)_3SiO_{0.5}$ unit, of viscosity 25 million centipoises at 25°C, 2.5 parts of the $\alpha,\omega$-di-(methoxy)-diorganopolysiloxane used in composition B, 40 parts of pyrogenic silica, treated with octamethylcyclotetrasiloxane, and 1 part of 0,0-(tertiary butyl)-0-isopropyl percarbonate.

The following are added separately to 100 parts of each of these compositions A, B and C:

0.0025 part of platinum in the form of a 0.5 percent by weight solution of $H_2PtCl_6 \cdot 6H_2O$ in isopropanol, and 30 parts of a 50 percent by weight dispersion, which has been finely ground by means of a 3-roll mill, of anhydrous ceric oxide $CeO_2$ in a diorganopolysiloxane rubber containing 99.8 percent of $(CH_3)_2SiO$ units and 0.2 percent of $(CH_3)CH_2=CHSiO$ units, terminated at each end by a $(CH_3)_3SiO_{0.5}$ unit, of viscosity 25 million centipoises at 25°C; the compositions A, B and C, thus modified, are called respectively $A_1$, $B_1$ and $C_1$.

$A_1$ and $B_1$ are cured to give elastomers by heating at 115°C for 8 minutes and $C_1$ is cured by heating at 140°C for 10 minutes, under a pressure of 50 bars, and then the crosslinking is completed by further heating for 4 hours at 200°C at atmospheric pressure, in a ventilated oven.

permanent set on compression in % according to Standard Specification ASTM D 395 — method B — (the samples of elastomers are kept for 70 hours at 150°C under a compression of 25 percent).

Their resistance to fire is also measured according to Standard Specification NF L 17101/A of BNAE. In order to satisfy the tests laid down by this standard specification, the end of the chimney of a Bunsen burner is placed at a distance of 19 mm below the middle of the lower edge of a sheet of the elastomer to be examined, of dimensions 14 × 7 × 0.2 cm, held in the vertical position by being fixed between 2 metal frames. The flame is adjusted to be at a height of 3.8 cm and a temperature of the order of 800°–845°C, and is kept in contact with the sheet for 12 seconds. The flame is then removed, and the period of time, during which the sheet burns or remains incandescent, and the length in cm, which has been charred, are determined.

These various values are given in Table 1 below:

TABLE I

|  | Shore hardness | Tensile strength in kg/cm² | Corresponding elongation in % | Permanent set on compression in % | Resistance to fire | |
|---|---|---|---|---|---|---|
|  |  |  |  |  | Burning time in seconds | Charred length in cm. |
| $A_1$ | 48 | 94 | 660 | 35 | 8 | 0.25 |
| $B_1$ | 46 | 106 | 685 | 35 | 10 | 0.3 |
| $C_1$ | 47 | 91 | 620 | 34 | 9 | 0.3 |
| $A'_1$ | 51 | 72 | 635 | 42 | 7 | 0.25 |
| $B'_1$ | 53 | 80 | 702 | 45 | 9 | 0.3 |
| $C'_1$ | 52 | 73 | 590 | 47 | 8 | 0.3 |

By way of comparison, the 30 parts of the 50 percent by weight dispersion of cerium oxide in a diorganopolysiloxane rubber in the 3 compositions $A_1$, $B_1$ and $C_1$ are replaced by 30 parts of a dispersion, also of 50% by weight, of titanium oxide, in the same rubber; these new comparative compositions are called $A'_1$, $B'_1$ and $C'_1$ and they are cured as above. The titanium oxide used is the pyrogenic oxide of particle diameter 0.03 μ.

6 different elastomers are obtained, the following mechanical properties of which are measured:
Tensile strength in kg/cm² according to Standard Specification AFNOR T 46-002,
corresponding elongation in %, also according to the same standard specification,
Shore hardness according to Standard Specification ASTM D 676, and It is noted that, although pyrogenic titanium oxide imparts good resistance to fire to the elastomers, which contain it, it has in contrast to cerium oxide a detrimental effect on their physical properties.

EXAMPLE 2

12 compositions, $A_2$, $A_3$, $A_4$, $A_5$, $A_6$, $A_7$, $A'_2$, $A'_3$, $A'_4$, $A'_5$, $A'_6$ and $A'_7$, ($A'_2 - A'_7$ being for comparison), are prepared by adding, to 100 parts of the composition A in Example 1, variable amounts of platinum, and cerium oxide or titanium oxide, the platinum being used in the form of the solution in isopropanol described in Example 1 and the cerium oxide or titanium oxide in the form of the 50 percent dispersion in a diorganopolysiloxane rubber also described in Example 1.

The various constituents of these 12 compositions are given in Table II below, and the numbers represent parts by weight.

TABLE II

|  | $A_2$ | $A_3$ | $A_4$ | $A_5$ | $A_6$ | $A_7$ | $A'_2$ | $A'_3$ | $A'_4$ | $A'_5$ | $A'_6$ | $A'_7$ |
|---|---|---|---|---|---|---|---|---|---|---|---|---|
| Composition A | 100 | 100 | 100 | 100 | 100 | 100 | 100 | 100 | 100 | 100 | 100 | 100 |
| Platinum | 0.0025 | 0.0025 | 0.0035 | 0.0035 | 0.0045 | 0.0045 | 0.0025 | 0.0025 | 0.0035 | 0.0035 | 0.0045 | 0.0045 |
| 50% by weight dispersion of ceric oxide | 10 | 20 | 10 | 20 | 10 | 20 |  |  |  |  |  |  |
| 50% by weight dispersion of titanium oxide |  |  |  |  |  |  | 10 | 20 | 10 | 20 | 10 | 20 |

These compositions are cured to give elastomers by heating at 115°C for 8 minutes and under a pressure of 50 bars, and the elastomers formed are then placed for 16 hours in a ventilated oven heated to 200°C. The mechanical properties and the resistance to fire are measured according to the standard specifications mentioned in Example 1. The values found are given in Table III below:

TABLE III

| | Shore hardness | Tensile strength in kg/cm$^2$ | Corresponding elongation in % | Permanent set on compression in % | Resistance to fire | |
|---|---|---|---|---|---|---|
| | | | | | Burning time in seconds | Charred length in cm. |
| $A_2$ | 53 | 93 | 605 | 25 | 11 | 0.25 |
| $A_3$ | 53 | 94 | 610 | 26 | 9 | 0.25 |
| $A_4$ | 53 | 93 | 615 | 25 | 9 | 0.3 |
| $A_5$ | 53 | 93 | 640 | 27 | 8 | 0.25 |
| $A_6$ | 53 | 92 | 615 | 26 | 11 | 0.2 |
| $A_7$ | 54 | 95 | 620 | 28 | 8 | 0.2 |
| $A'_2$ | 57 | 87 | 590 | 33 | 10 | 0.25 |
| $A'_3$ | 57 | 82 | 595 | 36 | 9 | 0.25 |
| $A'_4$ | 56 | 90 | 640 | 34 | 8 | 0.25 |
| $A'_5$ | 57 | 83 | 625 | 37 | 8 | 0.3 |
| $A'_6$ | 55 | 90 | 670 | 35 | 7 | 0.3 |
| $A'_7$ | 55 | 83 | 650 | 39 | 7 | 0.3 |

It is found that the presence of variable amounts of platinum and cerium oxide does not affect the physical properties of the elastomers, whilst imparting to them a noteworthy resistance to fire; although the platinum/titanium oxide combination is effective with regard to resistance to fire, it is no longer effective with regard to the physical properties of the elastomer and leads to results which are not very uniform.

EXAMPLE 3

3 curable compositions $B_2$, $B_3$ and $B_4$ are used, each of which contains:

100 parts of the composition B described in Example 1, 5 parts of ground quartz of average particle diameter 5 microns, 0.0035 part of platinum in the form of the organic complex described in Examples 6 and 7 of French Patent Specification No. 1,486,530 and 10 parts for $B_2$, 20 parts for $B_3$ and 30 parts for $B_4$ of a 50 percent by weight finely ground dispersion of lanthanum oxide $La_2O_3$ in an α,ω-dihydroxydiorganopolysiloxane rubber, of viscosity 15 million centipoises at 25°C, consisting of 99.7 percent of $(CH_3)_2SiO$ units and 0.3% of $CH_3(CH_2=CH)SiO$ units.

By way of comparison, 3 curable compositions $B'_2$, $B'_3$ and $B'_4$ are prepared by replacing, weight for weight, the dispersion of lanthanum oxide present in the compositions $B_2$, $B_3$ and $B_4$ by a dispersion of pyrogenic titanium oxide (of average particle diameter 0.03 micron), also of 50 percent by weight, in the same α,ω-dihydroxydiorganopolysiloxane rubber.

These compositions are then cured to give elastomers by heating at about 115°C for 8 minutes under a pressure of 50 bars, and the samples obtained are reheated for 16 hours at 200°C. The mechanical properties and the resistance to fire are then measured according to the standard specifications mentioned in Example 1.

The results are given in Table IV below:

TABLE IV

| | Shore hardness | Tensile strength in kg/cm$^2$ | Corresponding elongation in % | Permanent set on compression in % | Resistance to fire | |
|---|---|---|---|---|---|---|
| | | | | | Burning time in seconds | Charred length in cm |
| $B_2$ | 52 | 113 | 600 | 27 | 10 | 0.3 |
| $B_3$ | 50 | 105 | 590 | 26 | 7 | 0.25 |
| $B_4$ | 48 | 99 | 600 | 25 | 5 | 0.2 |
| $B'_2$ | 55 | 93 | 550 | 38 | 8 | 0.25 |
| $B'_3$ | 53 | 88 | 560 | 35 | 5 | 0.25 |
| $B'_4$ | 51 | 85 | 580 | 33 | 6 | 0.25 |

It is thus evident from these results that the platinum/titanium oxide combination, alters the mechanical properties of the elastomers in which it is present compared with the platinum/lanthanum oxide combination.

EXAMPLE 4

The following are added to 100 parts of the composition B described in Example 1:

5 parts of ground quartz of average particle diameter 5 microns 0.0035 part of platinum in the form of the organic complex described in Examples 6 and 7 of French Patent Specification No. 1,486,530 and 10 parts of a 50 percent by weight finely ground dispersion of a mixture of rare earth oxides (mixture consisting of 70 percent by weight of neodymium oxide $Nd_2O_3$ and 30 percent by weight of praseodymium oxide $Pr_6O_{11}$) in an α,ω-dihydroxydiorganopolysiloxane rubber, of viscosity 15 million centipoises at 25°C, consisting of 99.7 percent of $(CH_3)_2SiO$ units and 0.3 percent of $CH_3(CH_2=CH)SiO$ units.

This composition is cured to give an elastomer according to the process indicated in Example 3, and then the samples are reheated for 16 hours at 200°C. The relative values for the mechanical properties and the resistance to fire are as follows:

(trimethylsiloxy)-dimethylpolysiloxane oil, of viscosity 1,000 centipoises at 25°C.

These compositions are thereafter cured to give elastomers, by heating at about 115°C for 8 minutes under a pressure of 50 bars and the samples obtained are reheated for 16 hours at 200°C.

The relative values for the mechanical properties and for the resistance to fire are given in the table below:

TABLE V

| | Amount of platinum used | 50% by weight dispersion of ceric hydroxide, amount used | Shore hardness | Tensile strength in kg/cm² | Corresponding elongation in % | Permanent set on compression in % | Resistance to fire | |
|---|---|---|---|---|---|---|---|---|
| | | | | | | | Burning time in seconds | Charred length in cm |
| $D_1$ | 0.0025 | 5 | 54 | 94 | 680 | 27 | 18 | 0.5 |
| $D_2$ | 0.0035 | 3 | 52 | 95 | 680 | 28 | 14 | 0.4 |
| $D_3$ | 0.0035 | 5 | 53 | 92 | 650 | 28 | 11 | 0.3 |
| $D_4$ | 0.0035 | 10 | 55 | 92 | 630 | 27 | 15 | 0.4 |
| $D_5$ | 0.0045 | 5 | 54 | 91 | 610 | 30 | 9 | 0.3 |
| $D_6$ | 0.0065 | 5 | 54 | 90 | 620 | 30 | 10 | 0.3 |

Shore hardness 51, tensile strength in kg/cm² 110, corresponding elongation in % 630, permanent set on compression in % 24, burning time in seconds 10 seconds, charred length in cm 0.3.

EXAMPLE 5

6 compositions $D_1$, $D_2$, $D_3$, $D_4$, $D_5$ and $D_6$ are used, each consisting of:

34 parts of a diorganopolysiloxane rubber containing 99 percent of $(CH_3)_2SiO$ units and 1% of $CH_3(CH_2=CH)SiO$ units, terminated at each end by a $(CH_3)_2CH_2=CHSiO_{0.5}$ unit, of viscosity 13 million centipoises at 25°C, 35 parts of a dimethylpolysiloxane rubber, terminated at each end by a $(CH_3)_3SiO_{0.5}$ unit, of viscosity 20 million centipoises at 25°C, 2.5 parts of an $\alpha,\omega$-di-(hydroxy)-dimethylpolysiloxane of viscosity 50 centipoises at 25°C, containing 10 percent by weight of hydroxyl groups, 1.7 parts of an $\alpha,\omega$-dimethoxydimethylpolysiloxane of viscosity 8 centipoises at 25°C, containing 7 percent by weight of methoxy groups, 26.8 parts of a pyrogenic silica, treated with a mixture formed from 50 parts of octamethylcyclotetrasiloxane and 20 parts of hexamethyldisilazane, 5 parts of ground quartz of average particle diameter 5 microns, an amount of platinum which is 0.0025, 0.0035, 0.0045 or 0.0065 part and an amount of a dispersion of ceric hydroxide which is 3, 5 or 10 parts.

The platinum is used in the form of a dispersion of chloroplatinic acid in an $\alpha,\omega$-bis-(trimethylsiloxy)-dimethylpolysiloxane oil of viscosity 1,000 centipoises at 25°C; this dispersion contains 0.2 percent by weight of platinum. The ceric hydroxide is used in the form of a 50 percent by weight dispersion in an $\alpha,\omega$-bis-(trimethylsiloxy)-diorganopolysiloxane rubber, of viscosity 25 million centipoises at 25°C, consisting of 99.8 percent of $(CH_3)_2SiO$ units and 0.2 percent of $CH_3(CH_2=CH)SiO$ units.

Each composition is catalysed by 1 percent of its weight of a 50 percent by weight dispersion of 2,4-dichloro-benzoyl peroxide in an $\alpha,\omega$-bis-

EXAMPLE 6

A composition E is prepared by intimately mixing the following constituents:

100 parts of an $\alpha,\omega$-bis-(trimethylsiloxy)-diorganopolysiloxane rubber, of viscosity 20 million centipoises at 25°C, consisting of 99.7 percent of $(CH_3)_2SiO$ units and 0.3 percent of $CH_3(CH_2=CH)SiO$ units, 46 parts of pyrogenic silica with a large specific surface area, treated with octamethylcyclotetrasiloxane, 0.85 part of an $\alpha,\omega$-dihydroxydimethylpolysiloxane oil, of viscosity 40 centipoises at 25°C, containing 13 percent by weight of hydroxyl groups, 0.85 part of tetramethylethylenedioxydimethylsilane and 0.04 part of iron octoate.

A composition F is also prepared by intimately mixing the following constituents:

100 parts of a diorganopolysiloxane rubber containing 94 percent of $(CH_3)_2SiO$ units, 5.9 percent of $(C_6H_5)_2SiO$ units and 0.1 percent of $(CH_3)CH_2=CHSiO$ units, terminated at each end by a $(CH_3)_2CH_2=CHSiO_{0.5}$ unit, of viscosity 15 million centipoises at 25°C, 1.5 parts of an $\alpha,\omega$-di-(hydroxy)-dimethylpolysiloxane, of viscosity 40 centipoises at 25°C, containing 13 percent by weight of hydroxyl groups, 1.5 parts of an $\alpha,\omega$-di-(methoxy)-diorganopolysiloxane containing 70 percent of $(CH_3)_2SiO$ units and 30 percent of $(C_6H_5)_2SiO$ units, of viscosity 50 centipoises at 25°C, containing 6.5 percent of methoxy groups and 45 parts of pyrogenic silica, treated with octamethylcyclotetrasiloxane.

Using these two compositions E and F, 4 compositions $E_1$, $E_2$, $F_1$ and $F_2$ are prepared, each of which contains respectively 100 parts of the composition E or F, 5 parts of ground quartz of average particle diameter 5 microns, 5 parts of a 50 percent by weight dispersion of a mixture of rare earth hydroxides (mixture consisting of 70 percent by weight of neodymium hydroxide and 30 percent by weight of praseodymium hydroxide) in an $\alpha,\omega$-bis-(trimethylsiloxy)-dimethylpolysiloxane rubber of viscosity 20 million centipoises at 25°C and an amount of platinum which is 0.0035 or 0.0045 part in the form of the dispersion described in the preceding Example.

The compositions $E_1$, $E_2$, $F_1$ and $F_2$ are catalysed by 0.6 percent of their weight of 0,0-(tertiary butyl)-0-isopropyl percarbonate and they are all cured by heating at 140°C for 10 minutes under a pressure of 50 bars. The volatile materials which remain are removed by heating for 16 hours at 200°C in a ventilated oven. The relative values found for the mechanical properties and for the resistance to fire are listed in the table below.

constituents and heating them in a kneader at about 160°C for 4 hours under an atmosphere of nitrogen:

100 parts of an α,ω-bis-(dimethylvinylsiloxy)-diorganopolysiloxane rubber of viscosity 15 million centipoises at 25°C, containing 99.75 percent of dimethylsiloxyl units and 0.25% of methylvinylsiloxyl units, 5 parts of octamethylcyclotetrasiloxane, 7 parts of α,ω-dihydroxydimethylpolysiloxane, of viscosity 50 centipoises at 25°C, containing 10 percent by

TABLE VI

| | Amount of platinum used | Shore hardness | Tensile strength in kg/cm² | Corresponding elongation in % | Permanent set on compression in % | Resistance to fire | |
|---|---|---|---|---|---|---|---|
| | | | | | | Burning time in seconds | Charred length in cm |
| $E_1$ | 0.0035 | 60 | 95 | 410 | 27 | 9 | 0.3 |
| $E_2$ | 0.0045 | 60 | 97 | 425 | 26 | 9 | 0.3 |
| $F_1$ | 0.0035 | 52 | 107 | 610 | 36 | 8 | 0.25 |
| $F_2$ | 0.0045 | 52 | 113 | 625 | 36 | 7 | 0.25 |

EXAMPLE 7

Using the compositions E and F mentioned in Example 6, 8 compositions Ea, Eb, Ec, Ed, Fa, Fb, Fc and Fd are prepared, each consisting respectively of 100 parts of the composition E or F, 5 parts of the 50 percent by weight dispersion of ceric hydroxide described in Example 5, five parts of ground quartz of average particle diameter 5 microns, 0.0045 part of platinum in the form of the dispersion of chloroplatinic acid in an oil described in Example 5 and an amount of 0.33, 1.65, 3.3 or 10 parts of a 30 percent by weight dispersion of magnesium oxide in an α,ω-bis-(trimethylsiloxy)-dimethylpolysiloxane rubber of viscosity 25 million centipoises at 25°C.

The 8 compositions are catalysed by 0.4 percent of their weight of 2,5-dimethyl-2,5-di-(tertiary butyl)-peroxy-hexane and then cured by heating at 170°C for 10 minutes under a pressure of 50 bars; the samples are also reheated for 16 hours at 200°C. Their mechanical properties and their resistance to fire are then measured. The results are listed in the table below.

weight of hydroxyl groups, 10 parts of ground quartz of average particle diameter 5 microns, 45 parts of pyrogenic silica with a large specific surface area and 3 parts of diphenylsilanediol.

Using these compositions M, two compositions Ml and M2 are prepared, each of which contains 100 parts of the composition M, 5 parts of a 50 percent dispersion either of ceric hydroxide for M1 or of pyrogenic titanium oxide for M2, in an α,ω-bis-(dimethylvinylsiloxy)-dimethylpolysiloxane rubber of viscosity 15 million centipoises at 25°C and 0.0045 part of platinum in the form of the dispersion described in Example 5.

They are catalysed by 1 percent of their weight of the dispersion of 2,4-dichloro-benzoyl peroxide also described in Example 5, and are then cured by heating at about 115°C for 8 minutes under pressure. The samples of elastomers are then reheated for 16 hours at 200°C.

The relative values of the mechanical properties and

TABLE VII

| | Amount of the 30% by weight dispersion of magnesium oxide used | Shore hardness | Tensile strength in kg/cm² | Corresponding elongation in % | Permanent set on compression in % | Resistance to fire | |
|---|---|---|---|---|---|---|---|
| | | | | | | Burning time in seconds | Charred length in cm |
| Ea | 0.33 | 58 | 95 | 400 | 27 | 7 | 0.3 |
| Eb | 1.65 | 58 | 94 | 410 | 28 | 6 | 0.3 |
| Ec | 3.3 | 58 | 92 | 425 | 28 | 5 | 0.3 |
| Ed | 10 | 57 | 91 | 440 | 31 | 6 | 0.3 |
| Fa | 0.33 | 52 | 110 | 600 | 35 | 5 | 0.3 |
| Fb | 1.65 | 52 | 100 | 600 | 36 | 5 | 0.3 |
| Fc | 3.3 | 52 | 95 | 600 | 38 | 5 | 0.3 |
| Fd | 10 | 51 | 94 | 625 | 40 | 5 | 0.3 |

EXAMPLE 8

A composition M is prepared by milling the following of the resistance to fire are measured before and after reheating, and they are given in the table below:

TABLE VIII

| | | Shore hardness | Tensile strength in kg/cm² | Corresponding elongation in % | Permanent set on compression in % | Resistance to fire | |
|---|---|---|---|---|---|---|---|
| | | | | | | Burning time in seconds | Charred length in cm |
| M1 | (Not reheated | 71 | 90 | 300 | 35 | 35 | 0.6 |
| | (Reheated | 75 | 89 | 240 | 15 | 10 | 0.3 |

TABLE VIII—Continued

| | | Shore hardness | Tensile strength in kg/cm² | Corresponding elongation in % | Permanent set on compression in % | Resistance to fire | |
|---|---|---|---|---|---|---|---|
| | | | | | | Burning time in seconds | Charred length in cm |
| M2 | (Not reheated | 70 | 90 | 300 | 46 | 50 | 1.2 |
| | (Reheated | 74 | 75 | 230 | 20 | 35 | 0.5 |

It is thus seen from these results that, compared with titanium oxide, ceric hydroxide improves not only the physical properties but also the resistance to fire of an elastomer prepared from a composition, the various constituents of which were milled together under hot conditions.

I claim:

1. An organopolysiloxane composition curable on heating to an elastomer, the composition comprising by weight:
   a. 100 parts of at least one diorganopolysiloxane rubber of viscosity 2 million to 80 million centipoises at 25°C, consisting essentially of diorganosiloxyl units and blocked at each end of the polymer chain by a triorganosiloxyl, hydroxyl or alkoxy group of one to four carbon atoms, each organic radical bonded to a silicon atom being an alkyl, halogenoalkyl, vinyl, aryl or halogenoaryl radical, at least 50% of these organic radicals being methyl radicals,
   b. 5 to 100 parts of at least one inorganic filler selected from the group consisting of pyrogenic silica, precipitated silica, re-inforcing carbon black, diatomaceous silica, ground quartz, iron oxide, titanium oxide and calcium carbonate
   c. 0.2 to 5 parts of an organic peroxide,
   d. 0.001 to 0.01 parts of platinum in the form of a compound of platinum and
   e. either 3 to 35 parts in total of at least one rare earth metal oxide or 1 to 8 parts in total of at least one rare earth metal hydroxide.

2. A composition according to claim 1 wherein the polymer chain in rubber (a) is terminated with trimethylsiloxy radicals.

3. A composition according to claim 1 wherein the filler has been treated with an organosilicon compound selected from the group consisting of octamethyl cyclotetrasiloxane hexamethyldisilazane, trimethylchlorosilane and dimethylvinylchlorosilane.

4. A composition according to claim 1 comprising up to 20 parts of an organosilicon plasticizer selected from the group consisting of silanes with hydrolysable groups or hydrolysed or alkoxylated diorganopolysiloxane oils.

5. A composition according to claim 1 wherein the platinum compound is chloroplatinic acid, a platinum chloride/olefin complex or the reaction product of chloroplatinic acid and an alcohol or aldehyde.

6. A composition according to claim 1 wherein the rare earth metal is at least one of cerium, lanthanum, neodymium, praseodymium and samarium.

7. A composition according to claim 6 comprising 1 to 8 parts in total of at least one rare earth metal hydroxide and up to 5 parts of magnesium oxide.

8. A composition according to claim 1 comprising (a) 100 parts of a diorganopolysiloxane rubber having a least 94 percent of the organic radical bonded to silicon being methyl, the remainder being vinyl and/or phenyl, and terminated with trimethylsilyloxy radicals (b) 5-100 parts of silica, quartz or silica treated with an organosilicon compound selected from the group consisting of octamethyl cyclotetrasiloxane hexamethyldisilazane, trimethylchlorosilane and dimethylvinylchlorosilane (c) up to 20 parts of organosilicon plasticizer selected from the group consisting of silanes with hydrolysable groups or hydrolysed or alkoxylated diorganopolysiloxane oils (d) 0 to 20 parts of a pigment and 0 to 20 parts of a stabilizer consisting essentially of an octoate of iron, cerium or manganese, the total amount of pigment and stabilizer being not more than 20 parts (e) 0.2-5 parts of 2,4-dichlorobenzoyl peroxide, 0.0-(tertiary butyl) o-isopropyl percarbonate or 2,5-dimethyl-2,4-di-(tertiary butyl) peroxyhexane (f) 0.001-0.01 parts of a platinium compound which is chloroplatinic acid, a reaction product thereof with an alcohol or aldehyde or a platinum chloride/olefin complex (g) either (i) 3-35 parts of an oxide of cerium, lanthanum, neodymium or praseodymium or (ii) 1-8 parts of a hydroxide of cerium, neodymium or praseodymium and 0-5 parts of magnesium oxide.

9. An elastomer prepared by heating at 100° – 300°C an organopolysiloxane composition as claimed in claim 1.

10. An elastomer according to claim 9 wherein the polymer chain in rubber (a) is terminated with trimethylsiloxy radicals.

11. An elastomer according to claim 9 wherein the filler has been treated with an organosilicon compound selected from the group consisting of octamethyl cyclotetrasiloxane hexamethyldisilazane, trimethylchlorosilane and dimethylvinylchlorosilane.

12. An elastomer according to claim 9 comprising up to 20 parts of an organosilicon plasticizer selected from the group consisting of silanes with hydrolysable groups or hydrolysed or alkoxylated diorganopolysiloxane oils.

13. An elastomer according to claim 9 wherein the platinium compound is chloroplatinic acid, a platinum chloride/olefin complex or the reaction product of chloroplatinic acid and an alcohol or aldehyde.

14. An elastomer according to claim 9 wherein the rare earth metal is at least one of cerium, lanthanum, neodymium, praseodymium and samarium.

15. An elastomer according to claim 14 comprising 1 to 8 parts in total of at least one rare earth metal hydroxide and up to 5 parts of magnesium oxide.

16. An elastomer prepared by heating an organopolysiloxane composition as claimed in claim 8.

17. A composition according to claim 1 comprising 0 to 20 parts of a pigment and 0 to 20 parts of a stabiliser consisting essentially of an octoate of iron, cerium or manganese, the total amount of pigment and stabiliser being not more than 20 parts.

18. An elastomer according to claim 9 comprising 0 to 20 parts of a pigment and 0 to 20 parts of a stabiliser consisting essentially of an octoate of iron, cerium or manganese, the total amount of pigment and stabiliser being not more than 20 parts.

* * * * *